United States Patent [19]

Birch

[11] 3,850,435

[45] Nov. 26, 1974

[54] GRAMOPHONE PICKUP GUIDANCE MECHANISMS

[76] Inventor: Richard Wykeham Beaufoy Birch, Strelley Barn, Woodham Mortimer, Maldon, Essex, England

[22] Filed: Dec. 20, 1973

[21] Appl. No.: 426,894

Related U.S. Application Data

[63] Continuation of Ser. No. 140,081, May 4, 1971, abandoned.

[30] Foreign Application Priority Data

May 13, 1970 Great Britain .................... 23287/70

[52] U.S. Cl. .............................. 274/23 A, 274/13 R

[51] Int. Cl. .............................................. G11b 3/10

[58] Field of Search ............... 274/23 R, 23 A, 13 R

[56] References Cited

UNITED STATES PATENTS 2,915,315 12/1959 Rabinou ........................ 274/23 A X 3,272,513 9/1966 Jeles ............................ 274/23 A X

OTHER PUBLICATIONS

The Servo Groove Tracker, A. G. Johnson – Audio – 5/66.

*Primary Examiner*—Harry N. Haroian

[57] ABSTRACT

A pickup guidance mechanism for gramophone disc records comprising a pickup which can receive a stylus for engaging a groove on the record, an arm on which the pickup is carried for guidance across the record and which is pivoted for rotation in a plane parallel to the record, a source of radiation which emits radiation in a path, part at least of which extends in a radial direction with respect to the record rotation axis and sensing means responsive to said radiation and adapted whenever the pickup arm departs from a mean position in which tracking error is zero, to produce a command signal which effects return movement of the arm towards said mean position.

15 Claims, 32 Drawing Figures

INVENTOR
Richard Wykeham Beaufoy Birch
BY
ATTORNEY

INVENTOR
Richard Wykeham Beaufoy Birch
BY Ira Milton Jones
ATTORNEY

INVENTOR
Richard Wykeham Beaufoy Birch
BY [signature]
ATTORNEY

INVENTOR
Richard Wykeham Beaufoy Birch
BY Ira Milton Jones
ATTORNEY

INVENTOR
Richard Wykeham Beaufoy Birch
BY
ATTORNEY

INVENTOR
Richard Wykeham Beaufoy Birch
BY
ATTORNEY

INVENTOR
Richard Wykeham
Beaufoy Birch
BY
ATTORNEY

INVENTOR
Richard Wykeham Beaufoy Birch
BY [signature]
ATTORNEY

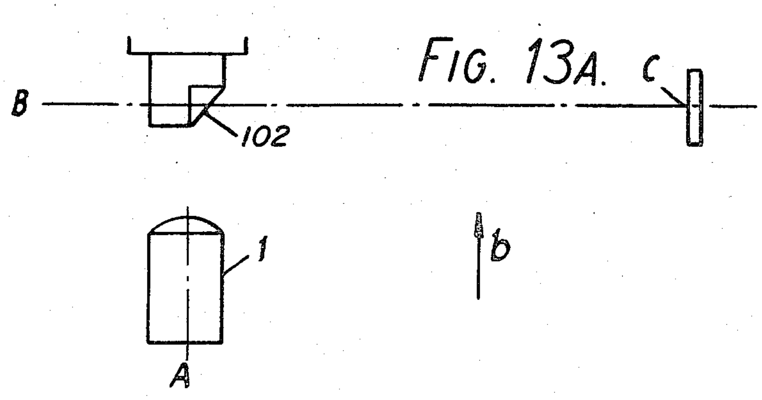
FIG. 13A.
FIG. 13B.
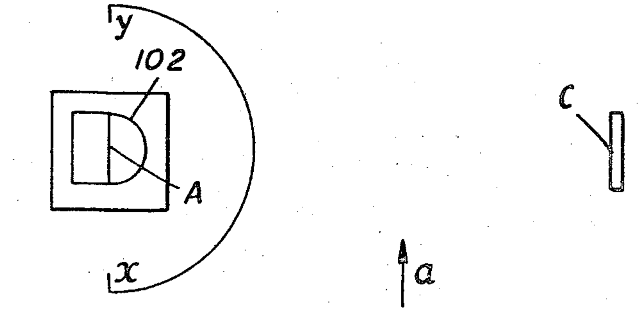
FIG. 14A.
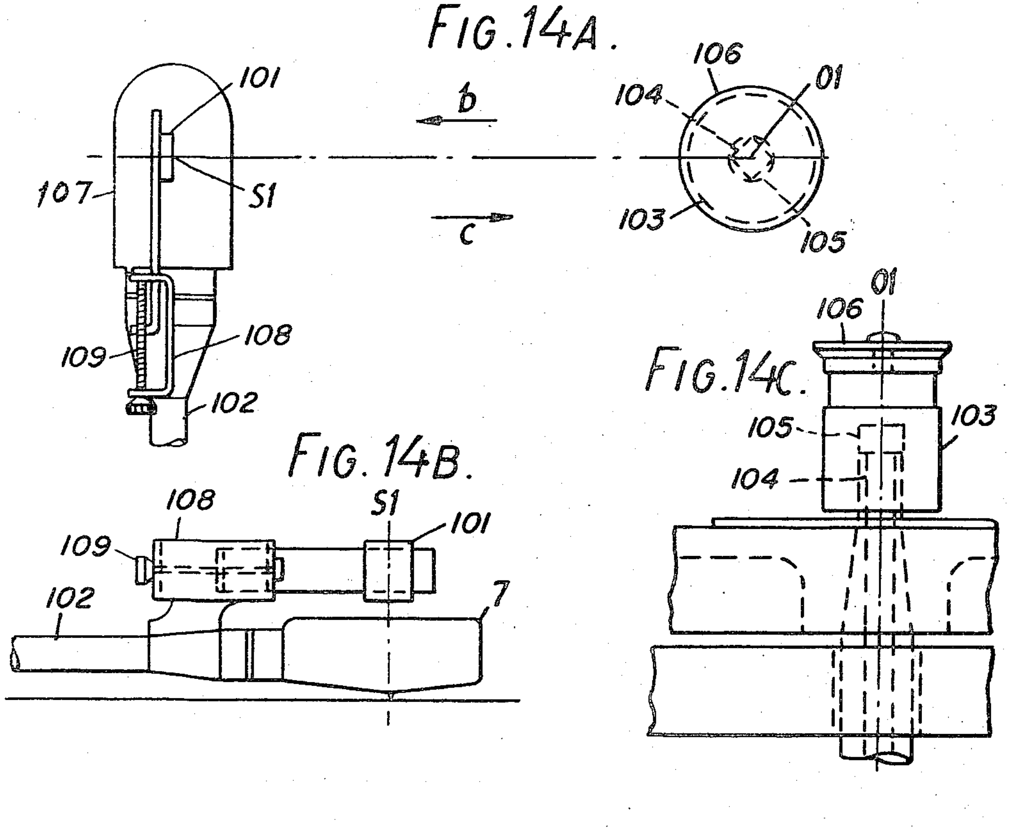
FIG. 14A, FIG. 14B, FIG. 14C.

GRAMOPHONE PICKUP GUIDANCE MECHANISMS

This application is a continuation of my copending application Ser. No. 140,081, filed May 4, 1971 now abandoned.

This invention relates to pickup guidance mechanisms and, more particularly, to a pickup guidance mechanism for a gramophone disc record player in which a gramophone disc record having a spiral groove containing a recorded signal is rotatable by turntable means which define a record axis of rotation and a record plane at right angles thereto.

In a stereophonic gramophone pickup, the stylus has freedom of movement in two directions at right angles and its small movements such as occur in usual operation can be considered as occurring in a certain plane, herein called the "excursion plane," which lies, commonly, at an angle of about 75° to the plane of the record. The line in which the excursion plane intersects the record plane is herein called the "excursion line." Pickups are, commonly, symmetrical in construction about a plane at right angles to the excursion plane and to the record plane. This plane is herein called the "symmetry plane," and its intersection with the record plane is herein called the "symmetry line."

For best audio reproduction the pickup requires to be oriented so that the excursion line passes through the record rotation axis. Commonly however this situation is not achieved and the angle occurring at any time between the excursion line and the record radius passing through the stylus is called the tracking error angle.

Conventional pickup arms are mounted, for rotation in a plane parallel to the record, about a pivot which is fixed relative to the baseboard of the apparatus, and are shaped for minimising tracking error, in consequence of which, the symmetry plane passes at a considerable distance from the pivot axis. Such arms enable a pickup to traverse a record with small tracking error, not exceeding perhaps 1½° at any time. From this, it follows that the tangent at the stylus to the mean groove, that is to say, the tangent to the groove if it were an unmodulated spiral, lies at only a small inclination to the symmetry line and passes, similarly, at a considerable distance from the pivot axis. Thus, the frictional drag force between stylus and record, being directed tangentially to groove, has a considerable turning moment about the pivot, tending to swing the arm inwards towards the record centre. This turning moment is resisted by a force at the stylus, and, if tracking error is zero at the time, this force is directed along the excursion line. If tracking error is small but not zero, the force acts at only a small inclination to the excursion line.

In conventional arms the pivot is, commonly, made as nearly frictionless as possible.

A force in the plane of the record, acting at the stylus along the excursion line, is called side-pressure, and the particular form of side-pressure resulting as described from the shaping of conventional arms for minimum tracking error is herein called "geometric" side-pressure. Any side-pressure is harmful to audio reproduction, because the mean position about which vibration of the stylus occurs in response to groove modulation is displaced from the equilibrium position and, contrary to the intended mode of operation, said vibration is unsymmetrical about the equilibrium position.

The angle in the record plane between the symmetry plane and the line joining the stylus to the pivot axis is called the "offset angle" of the arm. A conventional arm with a length of 8 inches from stylus to pivot will have an offset angle of about 27°.

It is clear that if the arm is shaped so that the offset angle is zero, then while the stylus is engaged in the groove and has said frictional drag force acting upon it, geometric side-pressure is zero. This is because, if the arm pivot is assumed frictionless, the equilibrating force upon the arm can act only in the direction from stylus to pivot axis and can have no component along the excursion line. An arm so shaped is herein called a "straight arm."

Thus, with a straight arm and a frictionless pivot, geometric side-pressure is zero whether tracking error is zero or not. When there is tracking error, the frictional drag force is accompanied by another force at the stylus directed radially upon the record, and the resultant of these two forces acts in the direction from arm pivot axis to stylus. When tracking error is zero, the excursion line is radial and the second of these two forces is zero.

The objects of the invention can now be stated in broad terms thus: first, the complete or nearly complete elimination of geometric side-pressure without increase of and if possible with the simultaneous reduction of tracking error.

The invention consists in a pickup guidance mechanism for a gramophone disc record player in which a gramophone disc record having a spiral groove containing a recorded signal is rotatable by turntable means which define a record axis of rotation and a record plane at right angles thereto, comprising, a pickup which can receive a stylus for engaging said spiral groove on the record and which experiences deflections to opposite sides of a symmetry plane when engaged with said groove upon rotation of the record on the turntable means, a first or pickup arm holding the pickup for guidance thereof across the record and pivoted for rotation in a plane parallel to the record plane about an axis which lies in the symmetry plane and is remote from the pickup, a slave arm mounted for rotation in a plane parallel to the record plane and pivotally supporting said first arm at said first arm axis, a radiation propagation and sensing system having elements so disposed in relation to the first arm and the record axis as to afford, in a position of the first arm in which tracking error is zero, i.e., when the symmetry plane is normal to the radial plane of the record containing an axis parallel with the record axis and passing through the point of engagement with the record of the stylus in its undeflected position, a radiation path which includes a line joining the record axis with said axis parallel with the record axis or a segment of that line, one of said elements of the system being mounted in said radiation path on said axis parallel with the record axis so as to be movable with said first arm and to effect, during operative engagement of the stylus on the record, on movement of said first arm, a change in the distribution of radiation sensed by the system thereby to produce, when said first arm is in a position other than said position thereof in which tracking error is zero, a command signal, and, correcting means responsive to said command signal and adapted to rotate the slave arm to effect movement of said first arm towards said position thereof in which tracking error is zero.

It will be seen that a beam of radiation is emitted so as to be effective substantially in the radial direction and co-operates with sensing means to detect any departure from a right angle of the angle, in the record plane, formed by the rotational centre of the record, the stylus contact point and the pickup arm pivot. The sensing means are described later. Assuming at present that the angle referred to is maintained a right angle, it is clear that for any geometrically continuous path of the stylus, there is for the pivot a corresponding continuous path, since the distance between the pivot and the stylus is a fixed length. Hence, for any given length of arm there is an infinity of choices of associated paths of stylus and pivot, and there is freedom to choose a pair of paths which is mechanically convenient. In particular, the use of the rotational axis of the record as a datum for the sensing of tracking error enables a true circular arc to be the path of the arm pivot.

Geometrical freedom is an advantage of the present invention, enabling the apparatus as a whole to be more compact, for a given maximum acceptable tracking error, than with a conventional arm.

Preferably, the radiation propagation and sensing system includes a source which is a source of light and sensing means in the form of photo-electric means.

The source of radiation can be fixed or rotatable and can emit radiation continuously or intermittently.

The invention will now be described, by way of example, with reference to the accompanying drawings, in which.

Figures 2, 3:
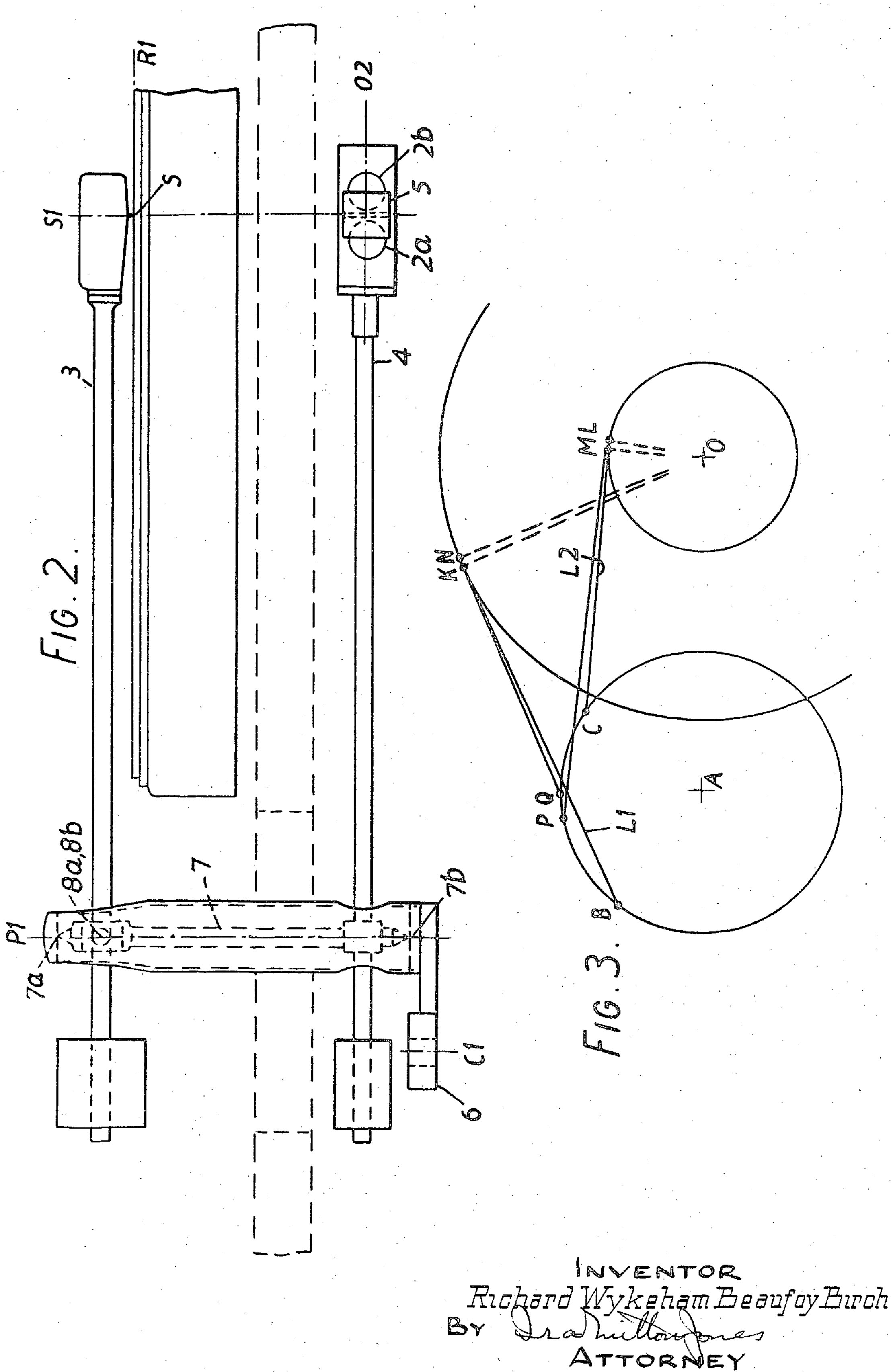
FIG. 2 is a view in the direction of arrow B in FIG. 1.
Figures 4A, 4B, 4C, 4D, 4E, 5A, 5B:
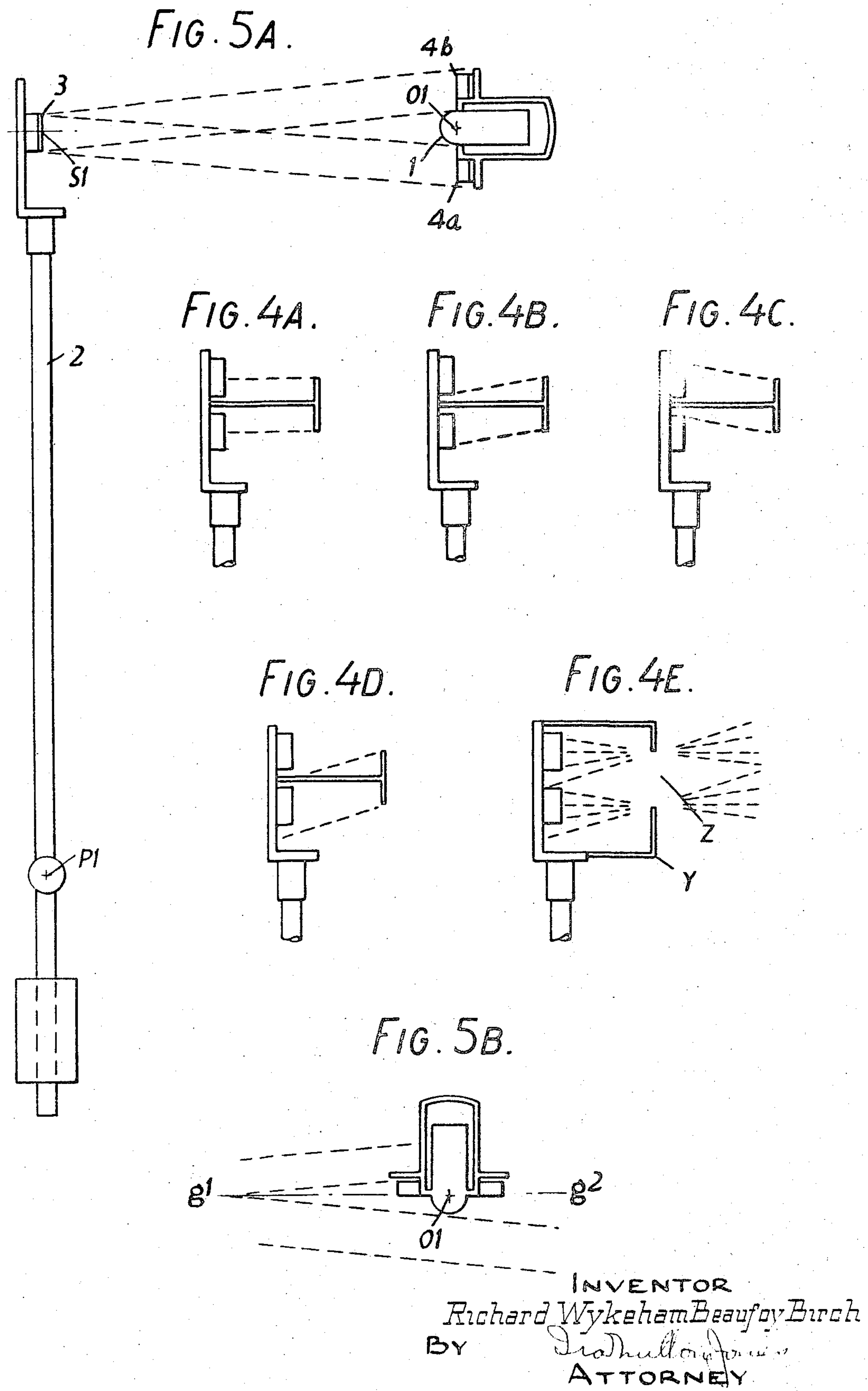
Figure 6A:
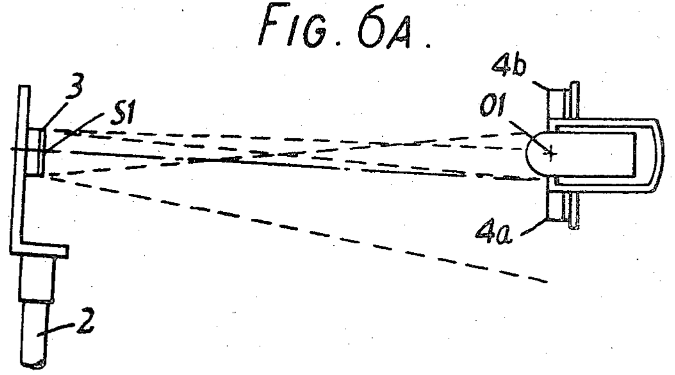
Figure 6B:
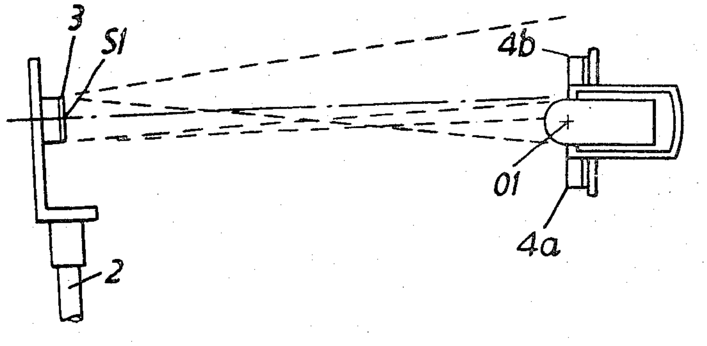
Figure 10A:
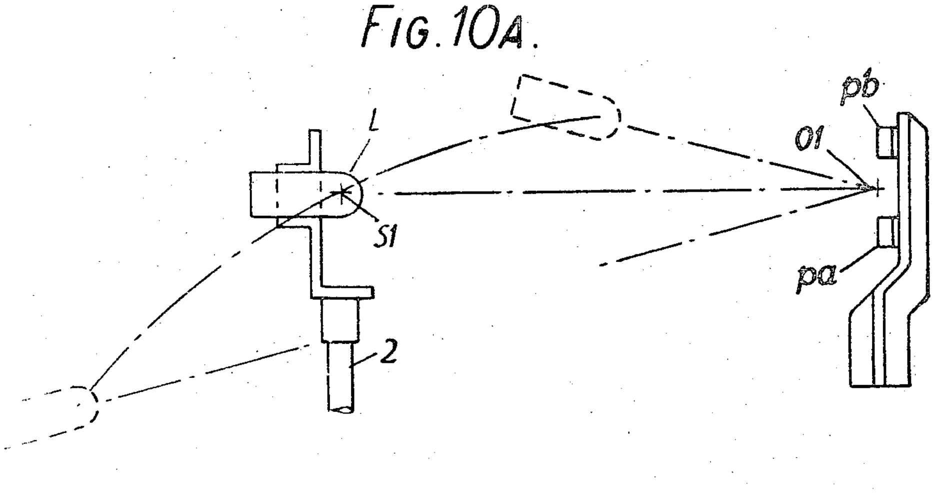
Figure 10B:
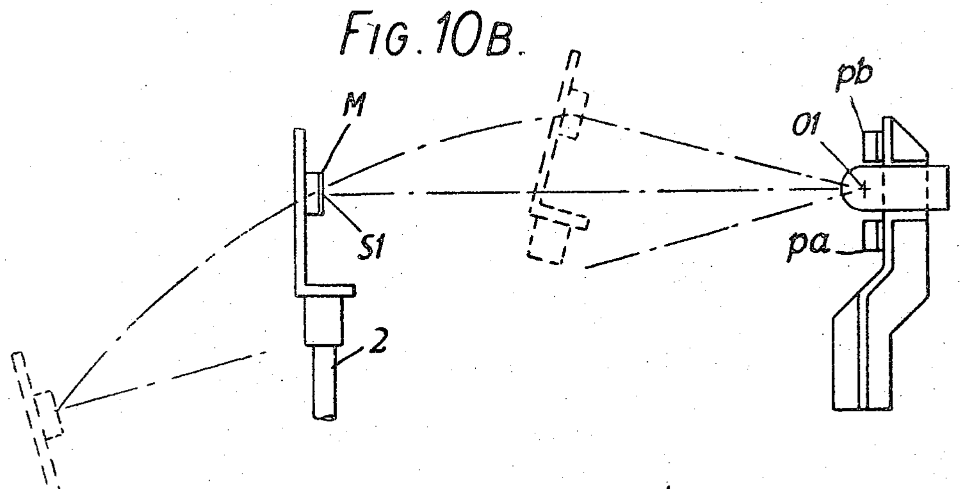

FIG. 3 is a diagram illustrating a feature of the geometry of the mechanism of the invention, FIG. 4A to 4D are plan views illustrating a part of an embodiment suitable for use with an autochanger mechanism, while FIG. 4E illustrates an alternative form of that part, FIG. 5A is a plan view of a further embodiment of the invention employing the principle of scanning, FIG. 5B and FIGS. 6A and 6B illustrate different positions of the embodiment of FIG. 5A, FIGS. 7A, 7B, 8A and 8B, 9A and 9B, illustrate further embodiments of the invention employing the principle of scanning, FIGS. 10A and 10B illustrate still further embodiments of the invention, FIGS. 11A to 11D and FIGS. 12A to 12C are diagrams of other dispositions of sensing elements of the invention, FIGS. 13A and 13B illustrate further dispositions of sensing elements of the invention employing the principle of scanning, and FIGS. 14A, 14B and 14C illustrate an embodiment of the invention not employing sensing elements below the baseboard.

Figure 1:
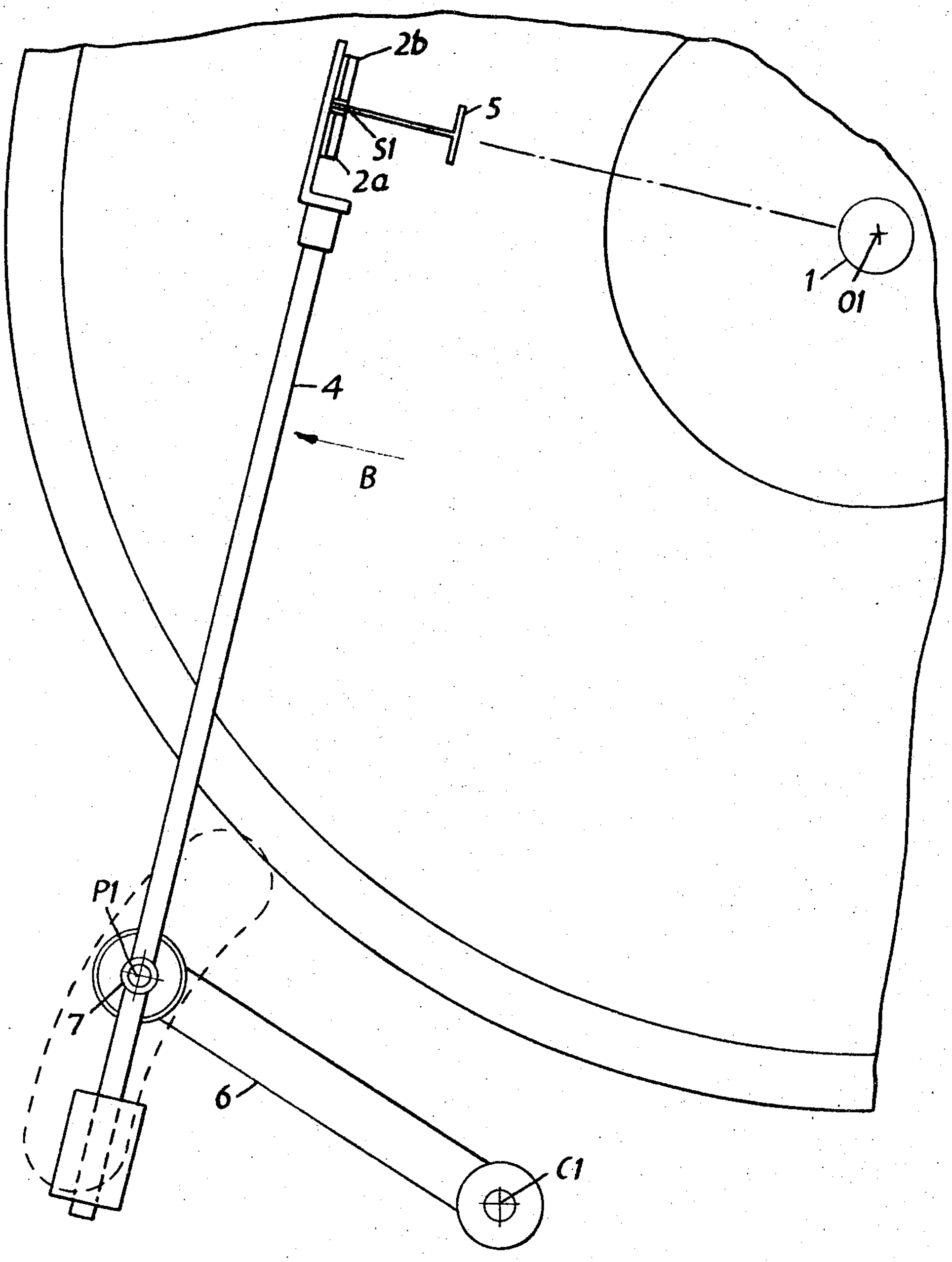
FIG. 1 is a plan view of parts of a pickup guidance mechanism below the baseboard thereof.

As a first example, the invention is now described in a form having optical means for the sensing of tracking error. With reference to FIGS. 1 and 2, the optical sensing means include a lamp 1 and a pair of photoelectric cells 2*a*, 2*b*, disposed so as to be effective in a plane 02, herein called "the optical plane," parallel to and lying below the record plane. The lamp is placed centrally, or nearly so, on the record rotation axis and emits a beam of light having sufficient angular spread to embrace at least the traverse of a line S1, herein called "the copy line," through the stylus S, and at right angles to the record plane. Between the copy line and the vertical axis P1 of rotation of the pickup arm 3 extends an arm, herein called "the ghost arm," 4, pivoted at said axis for horizontal rotation duplicating the horizontal rotation of the pickup arm itself, and carrying at its free end the pair of photocells 2*a*, 2*b*, symmetrically placed about the copy line and having their sensitive faces in, or nearly in, the plane containing the copy line and the ghost arm rotation axis, and symmetrically placed about the optical plane.

Electrical conductors for the photocells pass along the ghost arm and near its pivot are made very pliable and pass thence to the fixed part of the apparatus.

Between the photocells and the lamp is mounted, upon the ghost arm, an optical shutter, 5, so shaped that when tracking error is zero the cells, 2*a*, 2*b*, receive equal illumination and when tracking error is small but not zero the cells receive unequal illumination. Thus, for small tracking error up to an inclination at which one cell becomes just fully shadowed, increase of tracking error causes increase in difference of illumination of the respective cells. The use of two cells enables distinction between tracking error in respective opposite directions.

Tracking error larger than the aforesaid inclination corresponds to an optical condition which, broadly speaking, is constant, that is to say full illumination of one cell and full shadowing of the other.

The shutter, 5, is tee-shaped and it is clear that the stem portion of the tee, that is to say the portion extending at right angles to the ghost arm, causes shadowing of one cell or the other over a wide range of large tracking error in either direction. This is a valuable property, herein called "wide duple capture," since, as described later, it enables the control system to remain effective for correction of large tracking error in either direction.

In this example, the photocells are of a type wherein the electrical resistance varies according to the amount of incident light, and the difference, at any time, between the respective resistances is employed, taking due account of sense, as the basis of an electrical command signal to servo circuitry producing an output signal whereby movement of the pickup arm is effected, by means of a servo motor, for reduction of tracking error.

Briefly described, the servo circuitry is supplied with external power and operates as a control system of known closed-loop type: and includes elements for proportional response to input signal, and for the integrating on a time basis of input signal, and for power amplification: and produces, for driving an electric rotary reversible motor, an output whereby the direction, amount and speed of rotation of said motor are made suitable for the correction of error taking into account the speed at which tracking error would, in the absence of control, accumulate during the playing of ordinary commercial records including if desired the error occurring with records known as "swingers" in which the geometric centre of the groove spiral is displaced from the record rotation axis.

The servo circuitry can, if desired, include elements for response to rate of change of command signal and elements for phase change.

The servo motor 9 driven by said servo circuitry output, rotates the arm, 6, herein called "the slave arm," through orthodox reduction gearing 10*a*, 10*b* and an orthodox slipping device 11 which permits manual movement of the slave arm to occur without harm to the motor or gearing. The drive between the motor and the slave arm may if desired be biased, for example by spring means or gravity means, to overcome mechanical backlash. The slave arm is pivoted, near one end, for rotation about axis C1, and near its other end supports, at axis P1, a pivot for common horizontal rotation of the pickup arm 3 and the ghost arm 4. This common rotation is secured by attaching both said arms to a stem 7, which provides spaced pivots 8*a*, 8*b*, for vertical movement of the pickup arm and which itself rotates horizontally, relative to the slave arm, in spaced pivots 7*a*, 7*b*, on axis P1. Thus, in operation, the assembly comprising cells 2*a*, 2*b*, and shutter 5, is maintained symmetrical about the copy line and about the optical plane, and slave arm movement derived from error sensed in the optical plane and applied as correction thereof is valid as correction of tracking error at the pickup.

It is to be noted that the shape of the stylus path has not been mentioned and does not need to be mentioned. Given a pivot path and a pickup arm length, the automatic correction of tracking error will cause the stylus to follow a certain path, but this path need not be specified. Given the same pivot path and a different length for the pickup arm, the stylus path will be different but, apart from making the ghost arm the same length as the new pickup arm, no change need be made in the embodiment, which will operate successfully with either length of arm. This statement is true within certain limits. With refernce to FIG. 3, let the locus for the pivot at the axis P1 be the circle centred at A, and let the arc over which the slave arm is mechanically able to travel be the arc BC. Then the maximum possible arm length is L1, where BK is tangential at the outermost groove, and the required travel for the pivot is then arc BP, where PL is tangential at the innermost groove. Correspondingly the minimum possible arm length is L2, where CM is tangential at the innermost groove, and the required pivot travel is then arc QC, where QN is tangential at the outermost groove. It is clear that the control system can operate successfully with an arm having any length between L1 and L2. It is clear also that if in this Figure the angles ABK and ACL are allowed to approach zero and 180° respectively, control will become less easy since large rotation of the slave arm corresponds to only small movement of the stylus along the groove.

This embodiment illustrates a control feature which can be usefully altered to suit different circumstances. The feature is that at occurrence of tracking error of a certain amount, maximum electrical command is yielded by the photocells and continues thus at larger tracking errors. This is a useful feature when the embodiment including the pickup arm can be handled by the user. When the pickup is raised from the record, quick movement of the pickup can cause gross departure from tangentiality, and the described feature ensures that such departure is corrected at the maximum speed of which the control system is capable.

It is clear that by choice of dimensions of the tee-shaped shutter, that is to say, by choice of length of tee stem and breadth of tee head, the inclination whicn, for a given spacing of the cells, causes one cell or the other to be just shadowed, can be widely varied. In particular, that inclination can be made slightly less than the greatest tracking error which is likely to occur during the playing of ordinary records, including those known as swingers and those having a portion of groove at coarse pitch separating modulated bands at normal pitch. Thus, during a playing, the electrical command signal yielded by the cells is less than maximum, and the control system operates fully in the range wherein proportional response can be obtained. For convenience, error and correction in this range are herein called "fine" error and correction, denoting a range in which proportional control and time-integrating control are desirable features: while "coarse" error and "coarse" correction denote a range in which a simpler control suffices, for example, correction at a constant high speed until the error becomes small.

This arrangement is suitable, in particular, when the embodiment is used with an autochanger gramophone which does not provide for handling of the pickup arm by the user. Here, the speed of movement of the pickup, by automatic means, when disengaged from the record, can be limited in relation to the pursuit capability of the control system so that gross departure does not occur. Thus, it can be arranged that the greatest departure occurring in the whole autochange cycle is that which occurs at the lead-out groove, that is to say, the portion of groove at suddenly increased pitch which immediately precedes the closed finishing groove on a record: and this greatest departure can be used to actuate not the correcting mechanism but the then required autochange operation of lifting the pickup from the record. Commonly in autochangers, said lifting operation is triggered mechanically by a small-pressure velocity-trip device, and this device causes some side-pressure at the stylus during the whole of a playing. Thus, optical actuation offers a reduction of side-pressure and is obtainable without an additional photocell. FIG. 4A shows a shutter and photocells as in FIG. 1, at a time of zero error. FIGS. 4B and 4C show the disposition at times of maximum fine error in respectively the leading and the lagging sense, FIG. 4D shows a disposition, at a time of oarse error in the leading sense, such as can be employed to actuate an autochange operation.

It is a feature of arrangements such as that illustrated in FIGS. 1 & 2, in which a ghost arm is pivoted for rotation about a vertical axis only, that warp in a record does not cause any vertical movement of any sensing element and does not affect performance of the sensing means.

It is clear that a sensing method in which, at a certain amount of tracking error, certain parts of photocells are illuminated and other parts shadowed, has converse method by which the illuminated parts are shadowed, and vice-versa. For example, to a shutter shaped as in FIG. 4A there corresponds a shutter shaped as in FIG. 4E, where general light passing the shutter of FIG. 4A is excluded by a mask Y, and where light interrupted by the shutter of FIG. 4A is admitted by an aperture Z in the mask.

In this described embodiment the optical plane lies below the record plane. This feature can be advantageous when the embodiment is used with an autochanger gramophone, wherein the overall height of the apparatus is partly decided by the height required between the turntable and the stack of records awaiting play. This latter height has to accommodate played records and the record being played and the pickup arm, while below the baseboard of the turntable is a height occupied, commonly, by the autochange mechanism and the turntable motor. Thus by providing a ghost arm and by locating the sensing means below the baseboard, correction of tracking error is achieved without adding to the height required for the pickup arm.

An additional advantage lies in the fact that commonly, the turntable baseboard forms the top of a box which is, or can easily be made, light-proof. Hence, without any additional screening means the optical elements are screened from unwanted ambient light.

As a second example, an embodiment is now described in which the sensing means are optical and include the principle of scanning.

With reference to FIG. 5A showing a plan view of sensing means disposed in an optical plane as previously described, a source 1 of light is mounted for rotation about the record rotation axis O1, and emits a beam of light in the optical plane. On ghost arm 2 is mounted a mirror 3, lying in the plane containing the copy line S1 and the pickup arm pivot axis P1, and placed, suitably, symmetrically about the optical plane. Mounted for rotation about axis O1 are photocells 4A and 4B having their sensitive faces coplanar, or nearly coplanar, in a plane which includes said axis. The source 1, and the cells 4A, 4B, together are, in this example, mounted upon the turntable spindle and rotate with it, this optical assembly being called herein, for convenience, "the turret".

It is clear that when tracking error is zero or small, the cells are illuminated in each record revolution by the scanning of the mirror by the light beam. Sensing of tracking error depends upon difference in the illumination of the respective cells and, other things being equal, said difference is greatest when the source emits light in a fan-shaped beam having a spread of 180° at axis O1. A greater spread does not enable a greater difference. In this example, a spread of 180° is illustrated. In FIG. 5B, which assumes a condition of zero tracking error, it is evident that the illuminations of the respective cells as they pass from grazing incidence at *g1* to grazing incidence at *g*2 are equal. FIG. 6A shows a condition of small tracking error in the leading sense, and here the illumination, between grazing incidences, of cell 4A is greater than that of cell 4B. FIG. 6B shows a condition of lagging tracking error, and here correspondingly, the illumination of cell 4B is greater than that of cell 4A. The arrangement operates with a servo control system of the nature previously described above, whereby the pickup arm is moved so as to reduce tracking error in either sense.

Electrical conductors serving the source and the cells can, suitably, pass from the turret to the fixed part of the apparatus by slip-rings of known form.

The advantages of adopting an optical plane below the baseboard are as previously described.

The rotation angle, between grazing incidences, over which a cell is illuminated, is herein for convenience called the "scanning angle." In this example the scanning angle is 180°, and in that angle each cell is illuminated by the whole beam. Hence, provided that the beam is of constant brightness as regards passage of time, the electrical signal representing differentiation of illumination of the respective cells also truly represents tracking error, and it is not necessary that the beam of constant brightness as regards angular spread.

Figure 7A:
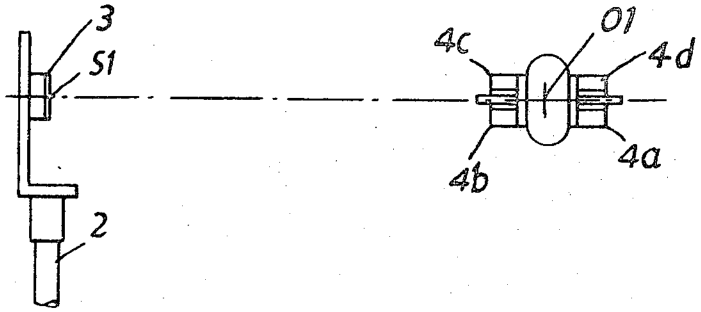
Figure 7B:
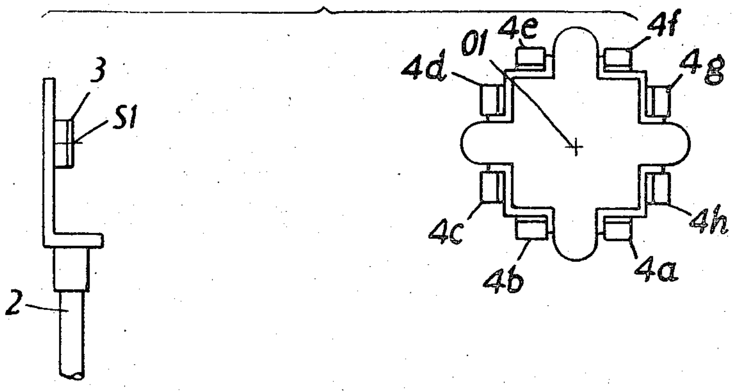
Figure 8A:
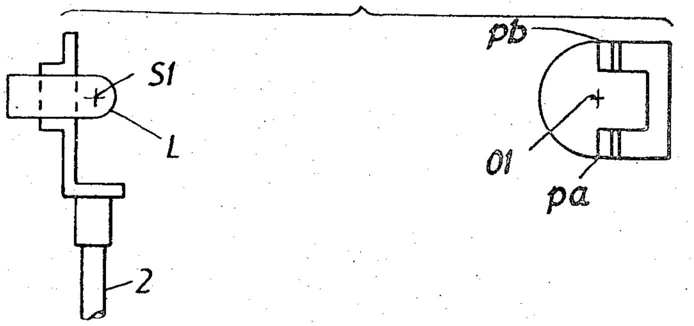
Figure 8B:
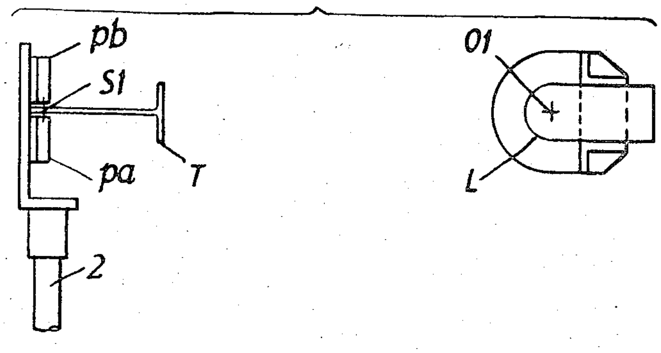
Figure 9A:
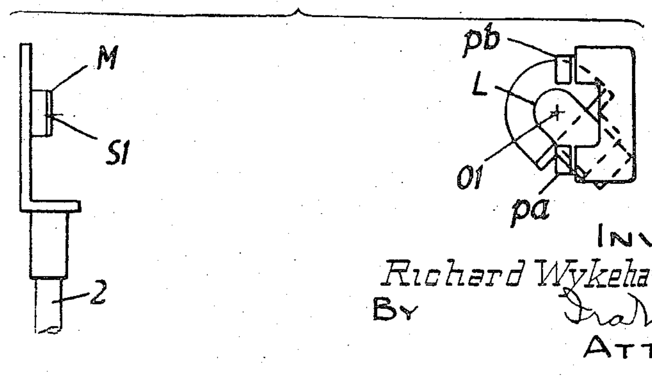
Figure 9B:
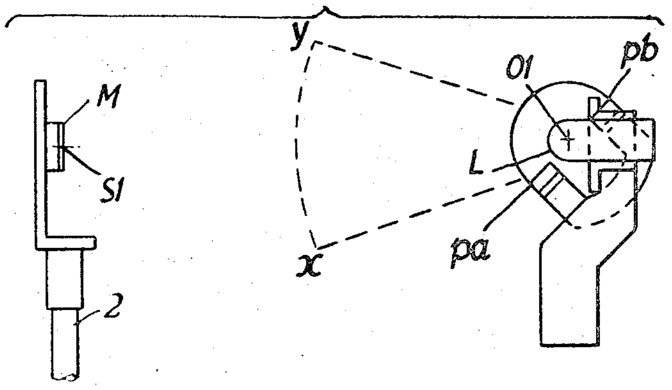

In this example, illumination of the respective cells is simultaneous, and the electrical signal from the turret contains from each cell a pulse, successive pulses being separated by a period in which neither cell is illuminated. One common speed of turntables is 100 revolutions in 180 seconds, corresponding in this example to one pair of pulses in 1.8 seconds. This time, 1.8 seconds, may be inconveniently long as a time-base for comparison of the pulses in a pair. However more frequent pulses may be obtained by using more than one pair of cells: for example two pairs as shown in FIG. 7A, or four pairs as shown in FIG. 7B. It is clear that in FIG. 7A, with cells 4*a*, 4*b*, 4*c*, 4*d* in a back-to-back disposition, the scanning angle is very nearly 180° whereas in FIG. 7B, with cells 4*a* to 4*h* in a hollow-square disposition, it is somewhat reduced. Broadly speaking, when more than two pairs of cells are used, the scanning angle becomes reduced as the cells of each pair are more widely spaced and as the mirror approaches the record centre. However when more than two pairs of cells are used it is clear also that, provided the light beam has sufficient angular spread, there is continuous illumination of the leading cell of one or other pair and of the trailing cell of one or other pair. Thus, the respective signals from the turret available for comparison in the servo circuitry are continuous.

The frequency of scanning can also be increased by increasing the rotation speed of the photocells: for example, instead of being mounted upon the turntable spindle so as to rotate with it, they may be rotated either by the turntable motor acting through suitable gearing or a suitable belt, or by separate motor, and the turntable spindle may be an axle upon which they rotate.

With reference to FIG. 7B, it is clear that the light beam from the source need not, as shown in the Figure, pass between respective pairs of cells but may pass above or below, the mirror then being plane and mounted at a suitable obliquity for, or being curved for, reflection towards the cells.

It is clear that scanning is obtainable whether the rotation of optical elements is in the same sense as turntable rotation or in the opposite sense thereto.

It is clear that there are many inherently possible ways of arranging the elements for sensing of error: broadly speaking, light may travel without reflection from record centre to stylus or from stylus to record centre, or may be reflected at the record centre or at the stylus, and there is a choice whether elements are rotatable or fixed. Of inherently possible arrangements, two kinds are herein not described further, namely: first, arrangements in which the pickup arm or ghost arm carries the light source and the photocells and, consequently, two sets of conductors, with consequent bad effect as regards side-pressure at the stylus: and, second, arrangements in which the pickup arm or ghost arm carries any rotating element, with consequent bad effect as regards vibration. It is to be noted however that by known methods, side-pressure whether geometric or caused otherwise can, in a mounting of the type herein described, be cancelled and that consequently a multiplicity of conductors on the pickup arm or ghost arm need be no disadvantage. In addition to these provisionally excluded arrangements, at least the following arrangements are possible: with reference to FIG. 8A, the ghost arm, 2, carries a light source, L, mounted symmetrically about the copy line, S1, while photocells *pa*, *pb*, rotate about the record rotation axis O1: with reference to FIG. 8B, the ghost arm, 2, carries photocells *pa*, *pb*, and a shutter T, disposed as in FIG. 1, and a light source L rotates about the record rotation axis O1: with reference to FIG. 9A, the ghost arm, 2, carries a mirror, M, and stationary photocells *pa*, *pb*, are mounted in a symmetrical manner about, while a light source, L, rotates about, the record rotation axis O1: with reference to FIG. 9B, the ghost arm, 2, carries a mirror, M, and a stationary light source, L, is mounted in a symmetrical manner about, while photocells *pa*, *pb*, rotate about, the record rotation axis O1, the arc *x–y* indicating a spread of light sufficient to embrace the travel, previously described, of copy line S1; with reference to FIG. 10A, the ghost arm carries a light source L, and stationary photocells *pa*, *pb*, are mounted in a symmetrical manner about record rotation axis O1, the broken outlines indicating the variation of angle of incidence of light upon the cells: with reference to FIG. 10B, the ghost arm carries a mirror M, and a stationary light source L and stationary photocells *pa*, *pb*, are mounted in a symmetrical manner about record rotation axis O1, the arc *x–y* indicating a spread of light as in FIG. 9*b* and the broken outlines indicating variation of angle of incidence as in FIG. 10*a*.

The adoption of scanning, as so far described, provides two features in the behaviour of the invention: first, that the need for angular uniformity of brightness in a diverging beam of light is unnecessary, and second, that any inaccuracy resulting from the slow variation, during a playing, of the angle of incidence of light on a photocell is avoided. However either of these features can if desired, for example for the sake of less complexity, be provided without the other, and it is clear that said first feature without said second feature is provided in the example in FIG. 9A whilst said second feature without said first feature is provided in the example in FIG. 9B.

Two special cases of path of the stylus are to be noted, namely: first, the case when the stylus travels along a line intersecting the record rotation axis, and second, the case when the stylus travels along a circle intersecting the record rotation axis. In the first case the ideal movement of the pickup arm is translational, without rotation, and ideally the stylus excursion line coincides with the stylus path line. There is here no need for any part of the sensing means to be located in specified relation to the record rotation axis: rather, the part or parts not in specified relation to the pickup arm may be located in specified relation to any point in the optical plane along the line joining the copy line to the record rotation axis. In the second case, with reference to British Pat. No. 1,191,845 and to the diagrammatic FIG. 11A, O is the record centre, S*a*–S*z* is the chosen path of the stylus from outermost to innermost portion of the groove, S*k* is any point in that path, S*k*P*k* is the alignment of the pickup arm axis such that angle OS*k*P*k* is a right angle as described, and it is evident that P*k*, the arm pivot axis, lies on the line S*k*X where OX is a diameter of the circle along which the stylus travels.

Figure 11A:
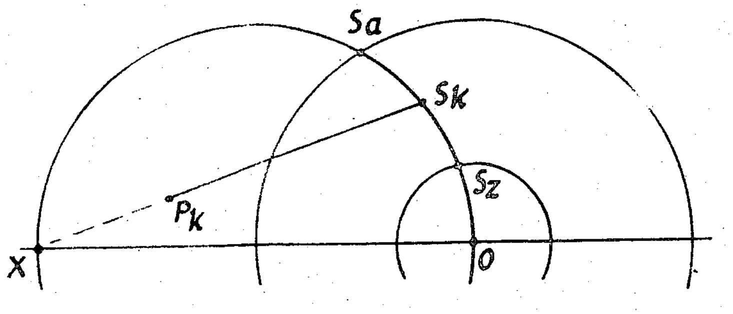
Figure 11B:
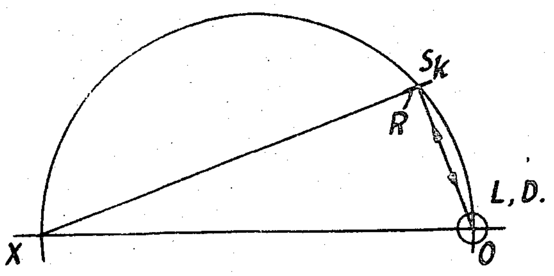
Figure 11C:
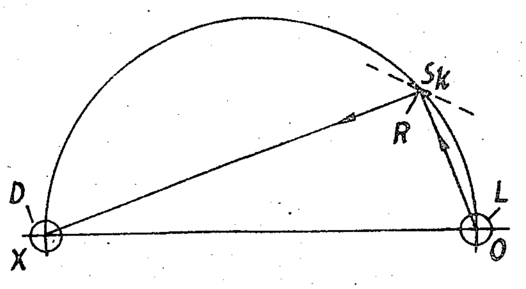
Figure 11D:
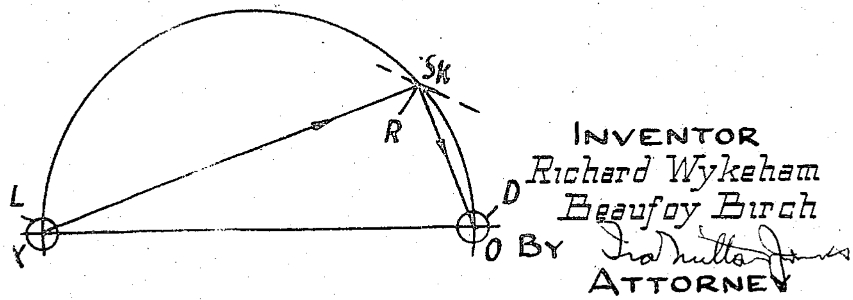

In the diagrammatic FIGS. 11B, 11C, 11D, L is a radiation source, D is a radiation detector, for example a pair of photocells when the sensing means are optical in nature, and R is a radiation reflector mounted for reflection from L to D. FIG. 11B shows diagrammatically a sensing arrangement previously described in which, in broad terms, R is at the copy line which L and D are at the record axis. In the special case of FIG. 11A however, other arrangements are possible, as shown in FIG. 11C where L is at the record axis and D at axis X, or in FIG. 11D where L is at axis X and D at the record axis.

Figure 12A:
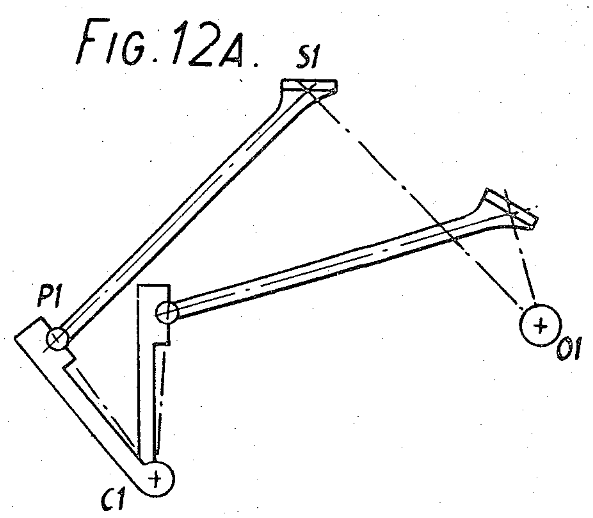
Figure 12B:
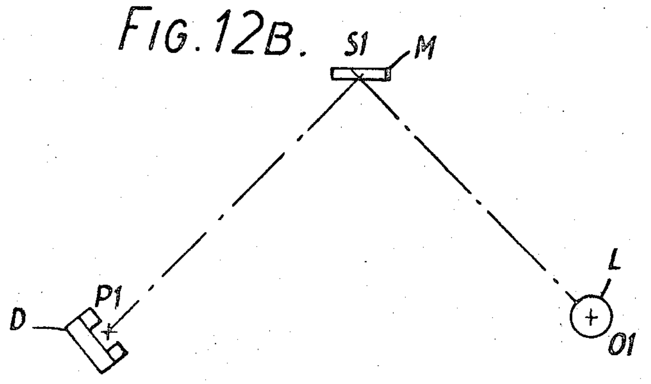
Figure 12C:
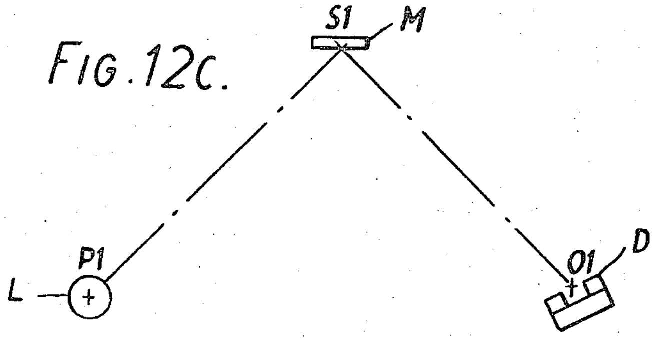
Figure 1:
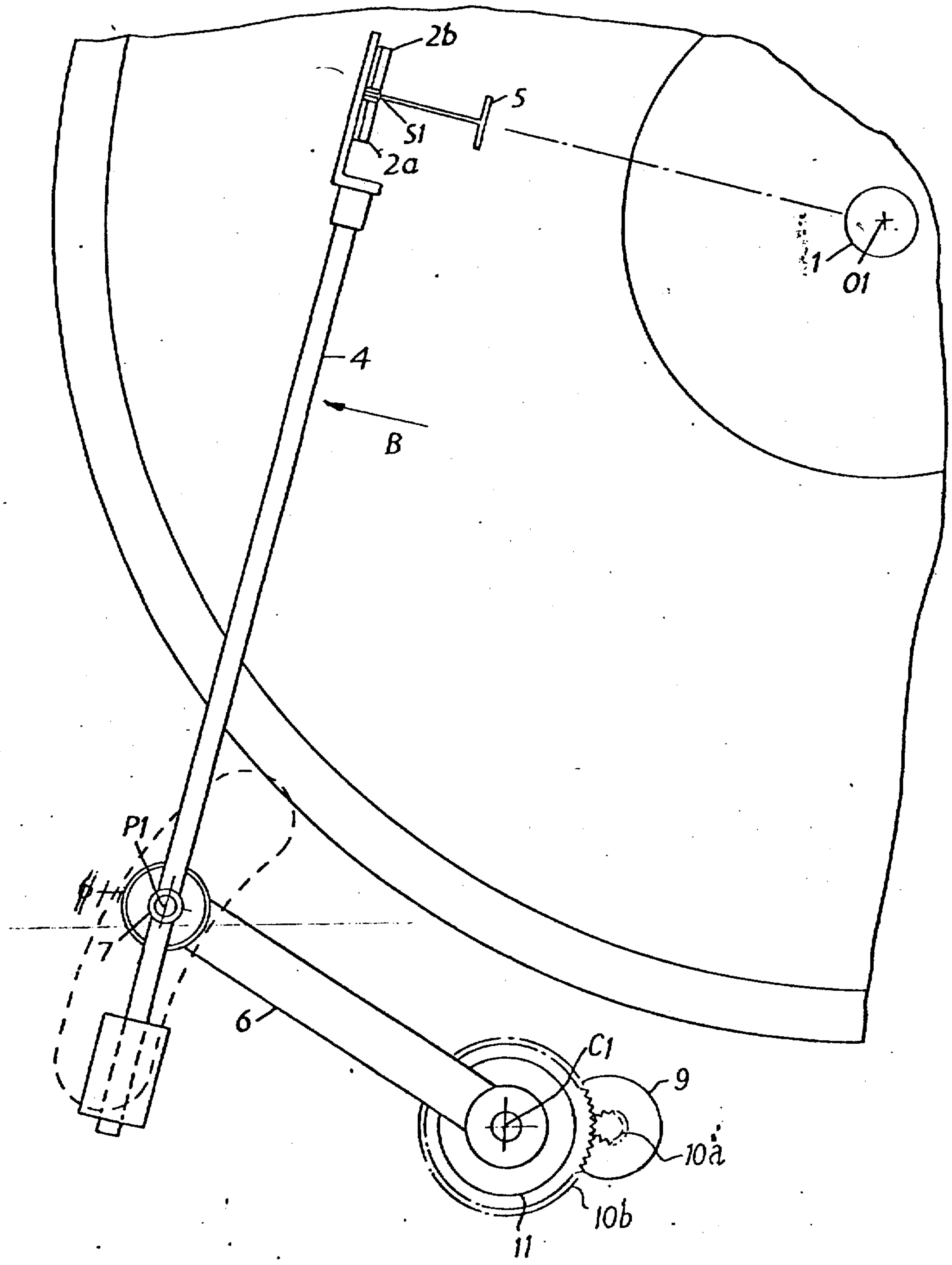
Figures 2, 3:
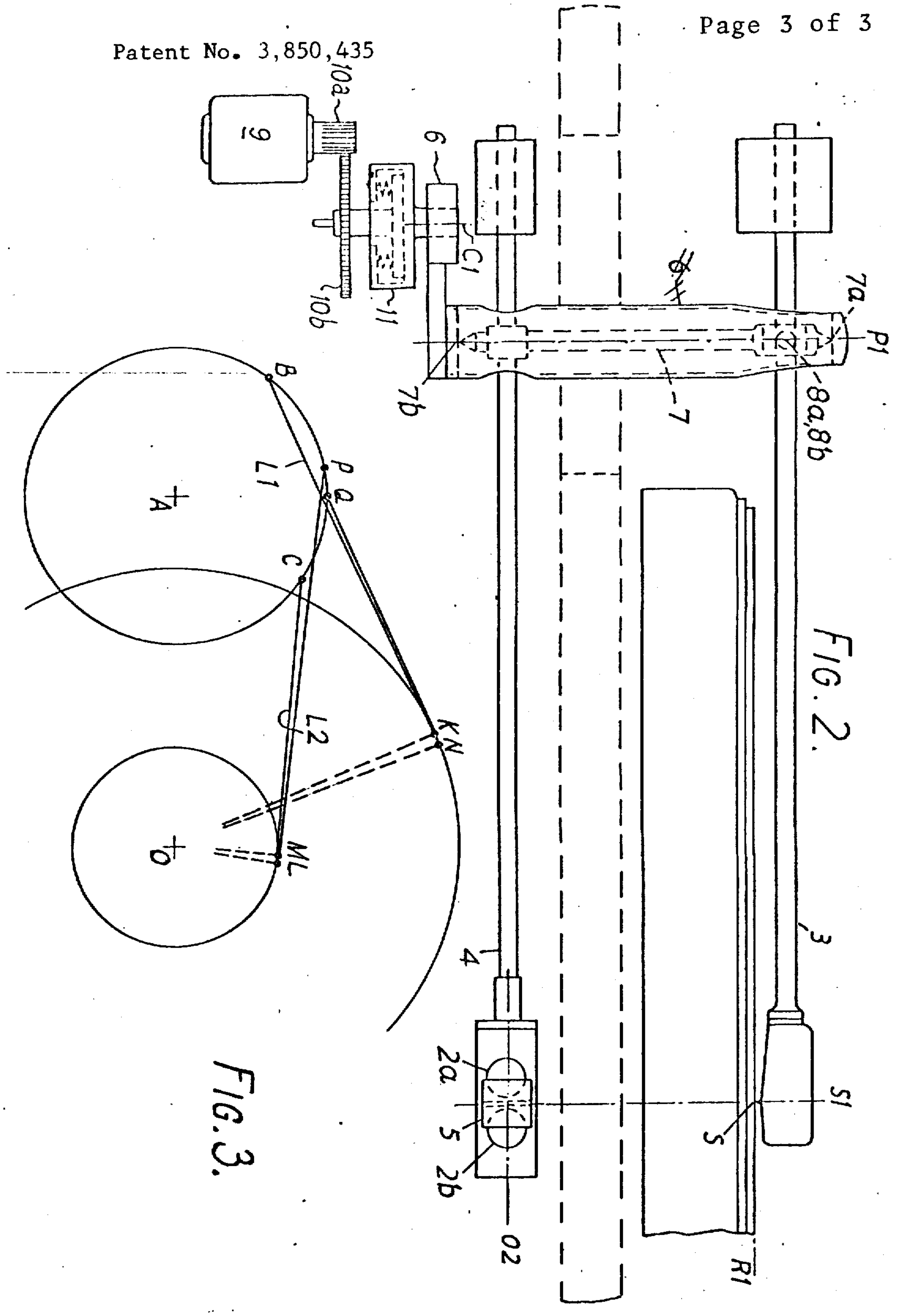

Further arrangements, not related to the Patent quoted above, are possible in which, with reference to the diagrammatic FIG. 12A, the pickup arm or ghost arm carries a radiation reflector in a plane inclined at 45° to the plane containing the copy line S1 and the pickup arm pivot axis P1, enabling reflection, at a time of zero tracking error, from the record rotation axis O1 to axis P1 or from axis P1 to axis O1. In such an arrangement employing for example light as the radiation, with reflector M at the copy line S1, an optical element mounted at axis P1 but on the slave arm not on the pickup arm or ghost arm can cooperate with an optical element mounted at axis O1 in a disposition as shown in FIG. 12B where a light source L is at axis O1 and a light detector D, for example a pair of photocells, is at axis P1, or as shown in FIG. 12C where L is at axis P1 and D is at axis O1. With these dispositions it is to be noted that electrical conductors serving the sensing means are not required upon either the pickup arm or the ghost arm.

In order to achieve scanning of a mirror or a photocell by the whole spread of a diverging beam of light, it is not necessary that the light source should itself rotate in the scanning direction. As an alternative, with reference to FIGS. 13A, 13B, the source 1 may rotate in a different direction, for instance at right angles to the scanning direction and about axis A, and may emit light in a beam parallel to its rotation axis towards reflector 102 conical in shape, which reflects the light into the scanning plane B at some desired angular spread over arc *x–y*, for example 180°. Thus, in the time of one revolution of the source, the reflected beam contains the whole emitted beam. Consequently, constancy of the time-integral of illumination of a body placed at C does not depend upon constancy of brightness, in the angular sense, of the beam around axis A. If it is convenient, for instance for the purpose of mounting, that the reflector should rotate about axis A, the described illumination at C is secured if the reflector is shaped as a full cone so as to reflect light in all directions in the scanning plane.

With reference to FIG. 3, the characteristic that an embodiment can operate successfully with pickup arms of different lengths is advantageous, particularly in a case where the embodiment is used with a gramophone not of the autochanger type. Here, reduction of required height above the turntable is not of prime importance and it can be convenient to have the propagation plane above the record plane. A ghost arm is then unnecessary, and sensing elements can be attached to the pickup arm itself. FIGS. 14A, 14B, 14C, show such an arrangement employing optical means. Here, a mirror 101 is mounted on arm 102 which carries pickup 107, and turret 103, containing a light source and photocells is attachable to spindle 104 which is the turntable spindle, so as to rotate therewith. Spindle 104 is, suitably, hollow and contains electrical conductors serving the turret through sliding contacts between the turret and the faces, here shown as four in number, of boss 105 in which spindle 104 terminates. Near the other end of spindle 104, said conductors can be connected to slip-rings continuing the respective circuits to the fixed part of the apparatus.

Knurled rim 106, rotatable on the turret, permits the turret to be slipped on and off the spindle by hand while the turntable is rotating and without harm thereto.

The position of mirror 101 along bracket 108 can be adjusted, by rotation of screwed rod 109, so that the mirror can be disposed centrally above the stylus.

With this arrangement, substitution of one pickup for another, whereby the arm length between stylus and pivot axis is altered, does not affect successful operation of the embodiment.

By proper choice of shape and dimensions of the elements of the sensing means, it can be achieved that the desired action is obtained though the record being played is warped.

In embodiments in which the propagation plane is above the record plane, elements which in other embodiments are located at the record rotation axis or are mounted upon the turntable spindle, may be fixed to or be rotatably mounted upon an arm member which in its operating position lies above the record and locates said elements in desired relation to said axis and which, to allow the changing of records can be moved, for example by hinging, clear of the turntable. Said arm member can if desired hold a turret against the turntable spindle for rotation therewith.

In the embodiments described, the radiation employed in th sensing of error has been visible light and the sensing means have included photocells. However other radiations can be employed, for example electromagnetic radiation having a frequency outside the frequency range of visible light, or molecular vibration in the air. Any convenient form of radiation may be employed for which suitable generators, receptors and, if required, reflectors are available and of which the wavelengths are suited to the dimensions of the apparatus with which sensing is concerned. As examples, electromagnetic radiation of infra-red frequency, and airborne vibrations of ultrasonic frequency, may be mentioned: techniques for employing either of these for transmission of information are well established. Thus, as regards generality of application of the invention, it is not to be inferred that an embodiment described as employing visible light in its sensing means cannot equally successfully employ other radiation in its sensing means.

If it is found inconvenient to place a radiation source at a particular line, for example the record rotation axis, then the source can be placed elsewhere and the radiation can, by means of reflectors, or refractors, or electromagnetic or electrostatic focussing means, be made to pass through or diverge from that line so as to have the effect of a radiation source situated thereat.

In any embodiment including scanning and in which a desired scanning angle, as defined, is obtained, said angle being less than 360°, it is clear that in place of continuous rotation whereby scanning occurs in only part of each revolution, an oscillatory rotation may be provided whereby scanning occurs in alternate directions at successive occurrences. For example, with a scanning angle of 180° such as has been described, an oscillatory rotation embracing that angle or a slightly greater angle fulfills the same purpose.

In the described servo circuitry, there occur, or there can easily be obtained, potential differences which can be used to actuate a display indicating the amount and sense of tracking error at any time. For example, a centre-zero potential-meter, for example a millivoltmeter, of familiar form can be connected into the circuitry so as to indicate potential across the described photocells or across other suitable elements near the output end of the circuitry. In combination with such a display, a feature can be provided which is useful when handling of the pickup by the user is intended: : namely that, by a selector switch, a command signal derived from, suitably, a manually-operated centre-tapped potentiometer may act instead of a command signal derived from the described sensing means. With such switch and such potentiometer, gross departure of the pickup arm can be corrected by the user, conveniently and at variable speed. Alternatively, in a simpler example, a selector switch may be connected to provide in one position the described automatic correction derived from the sensing means, in a second position rotation of the slave arm at a certain desired speed in one sense, and in a third position similar rotation in the opposite sense. By such means, the user can ensure that, when the pickup is lowered on to a record, tracking error is zero or, if not zero, is such that fine correction as defined can be applied to it when automatic correction is switched into operation.

I claim:

1. A pickup guidance mechanism for a gramophone disc record player in which a gramophone disc record having a spiral groove containing a recorded signal is rotatable by turntable means which define a record axis of rotation and a record plane at right angles thereto, comprising:

A. a pickup which can receive a stylus for engaging said spiral groove on the record and which experiences deflections to opposite sides of a symmetry plane when engaged with said groove upon rotation of the record on the turntable means;

B. a first or pickup arm holding the pickup for guidance thereof across the record and pivoted for rotation in a plane parallel to the record plane about an axis which lies in the symmetry plane and is remote from the pickup;

C. a slave arm mounted for rotation in a plane parallel to the record plane and pivotally supporting said first arm at said first arm axis;

D. a radiation propagation and sensing system having elements so disposed in relation to the first arm and the record axis as to afford, in a position of the first arm in which tracking error is zero, i.e., when the symmetry plane is normal to the radial plane of the record containing an axis parallel with the record axis and passing through the point of engagement with the record of the stylus in its undeflected position a radiation path which includes a line joining the record axis with said axis parallel with the record axis or a segment of that line, one of said elements of the system being mounted in said radiation path on said axis parallel with the record axis so as to be movable with said first arm and to effect, during operative engagement of the stylus on the record, on movement of said first arm, a change in the distribution of radiation sensed by the system thereby to produce, when said first arm is in a position other than said position thereof in which tracking error is zero, a command signal; and E. correcting means responsive to said command signal and adapted to rotate the slave arm to effect movement of said first arm towards said position thereof in which tracking error is zero.

2. A mechanism as claimed in claim 1, wherein the record plane and said line of the radiation path are spaced apart and said line or said segment thereof lies within the radiation when the first arm is in the position thereof in which tracking error is zero.

3. A mechanism as claimed in claim 1, wherein the radiation propagation and sensing system includes a source of radiation and sensing means, the source of radiation being arranged so that the sensing means are scanned by the radiation from the source during rotation of a record.

4. A mechanism as claimed in claim 1, wherein the radiation propagation and sensing system includes a radiation source which is a light source and sensing means which are photocell means.

5. A mechanism as claimed in claim 1, wherein said line of the radiation path is disposed above the level of a baseboard of the mechanism.

6. A mechanism as claimed in claim 5, wherein the radiation propagation and sensing system includes a radiation source and/or sensing means carried on a turret removably mounted on a spindle of the turntable means of the record player.

7. A mechanism as claimed in claim 6, wherein the radiation propagation and sensing system includes a radiation reflector mounted in fixed relationship with respect to the pickup, and the turret carries both the source of radiation and sensing means of said system towards which sensing means the reflector directs radiation from the source.

8. A mechanism as claimed in claim 1, wherein said line of the radiation path is disposed below the level of a baseboard of the mechanism.

9. A mechanism as claimed in claim 8, wherein there is provided, mounted for rotation together with the pickup arm, in a plane parallel with the record plane and located below the level of a baseboard of the mechanism, a further, so-called, "ghost" arm contained in the same plane normal to the record plane as the pickup arm, the ghost arm carrying one of the elements of the radiation propagation and sensing system on the axis parallel with the record axis through the point of engagement of the stylus with the record.

10. A mechanism as claimed in claim 9, wherein the radiation propagation and sensing system includes a radiation source which is a light source and sensing means towards which the light source is directed and which comprises a pair of photocells and a mask which cooperates with the photocells so that in the position of the pickup arm in which tracking error is zero, the cells are equally illuminated by the light source while in positions of the pickup arm departed from the zero tracking error position in respective opposite senses the cells are differentially illuminated in opposite manners corresponding with the senses of departure from its zero tracking error position of the pickup arm.

11. A mechanism as claimed in claim 10, wherein the light source is mounted at the record rotation axis and the photocells are disposed symmetrically on opposite sides of the light source with their sensing surfaces coplanar and containing the record rotation axis, the ghost arm carrying, below the pickup stylus, a mirror for reflecting light from the source to the photocells.

12. A mechanism as claimed in claim 11, wherein the light source and/or photocells are mounted so as to rotate with the record whereby scanning of the photocells by the light beam from the source is effected at least once during each revolution of the record.

13. A mechanism as claimed in claim 10, wherein the radiation propagation and sensing system includes a reflector mounted on the ghost arm and further includes a plurality of light sources mounted in equiangularly spaced relationship round the record rotation axis and a plurality of pairs of photocells, the cells of each pair of which are symmetrically arranged with respect to a light source, the light sources and the cells being mounted so as to rotate with the record whereby scanning of the photocells by the light from the sources being reflected by the reflector is successively effected during revolution of the record.

14. A mechanism as claimed in claim 4, wherein the radiation propagation and sensing system includes a reflector fixed with respect to the pickup and disposed on the axis parallel with the record axis through the point of engagement with the record of the stylus and the radiation path extends from the record rotation axis to the rotation axis of the pickup arm on the slave arm, the light source and sensing means being located at opposite ends of said path.

15. A mechanism as claimed in claim 4, wherein the radiation propagation and sensing system includes a reflector fixed with respect to the pickup and disposed on the axis parallel with the record axis through the point of engagement with the record of the stylus, the radiation path extending from the record rotation axis to a point on the circumference of a circle which intersects the record rotation axis and said axis parallel thereto, the light source and sensing means being located at opposite ends of said path.

* * * * *

UNITED STATES PATENT OFFICE
CERTIFICATE OF CORRECTION

Patent No. 3,850,435 Dated Nov. 26, 1974

Inventor(s) Richard Wykeham Beaufoy Birch

It is certified that error appears in the above-identified patent and that said Letters Patent are hereby corrected as shown below:

Column 5, line 38: Change "refernce" to --reference--

Column 6, line 3: Change "whicn" to --which-- line 47: Change "oarse" to --coarse-- line 57: Change "has converse" to --has a converse--

Column 7, line 46: Change "gl" to --gI--

Column 8, line 4: After "beam" insert --be--

Column 10, line 7: "which" should read --while--

Column 11, line 35: "th" should read --the--

Signed and sealed this 29th day of April 1975.

(SEAL)
Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,850,435 Dated November 26, 1974

Inventor(s) Richard Wykeham Beaufoy Birch Page 1 of 3

It is certified that error appears in the above-identified patent and that said Letters Patent are hereby corrected as shown below:

FIGS. 1, 2 and 3, should appear as shown on the attached sheets.

Signed and Sealed this

Tenth Day of August 1976

[SEAL]

*Attest:*

RUTH C. MASON
*Attesting Officer*

C. MARSHALL DANN
*Commissioner of Patents and Trademarks*